United States Patent
Lau

(10) Patent No.: US 7,670,032 B2
(45) Date of Patent: Mar. 2, 2010

(54) COMPACT, STEERABLE, MULTIDIRECTIONAL PHOTOGRAPHIC LIGHT DIFFUSER AND REFLECTOR

(76) Inventor: Ken M. Lau, P.O. Box 1847, Pacifica, CA (US) 94044

( * ) Notice: Subject to any disclaimer, the term of this patent is extended or adjusted under 35 U.S.C. 154(b) by 251 days.

(21) Appl. No.: 12/069,298

(22) Filed: Feb. 8, 2008

(65) Prior Publication Data

US 2008/0316754 A1 Dec. 25, 2008

Related U.S. Application Data

(60) Provisional application No. 60/936,852, filed on Jun. 21, 2007.

(51) Int. Cl.
F21V 17/02 (2006.01)
G03B 15/06 (2006.01)

(52) U.S. Cl. .......................... 362/322; 362/17; 362/18; 362/346; 359/225.1; 359/226.2

(58) Field of Classification Search ............ 362/16–18, 362/327, 331, 346, 319–320, 322; 396/4, 396/155, 198, 554; 359/198.1, 200.1–200.2, 359/212.2, 221.1–221.4, 225.1–226.2
See application file for complete search history.

(56) References Cited

U.S. PATENT DOCUMENTS

| 254,523 | A | | 3/1882 | Wheeler |
|---|---|---|---|---|
| 1,169,853 | A | | 2/1916 | Menssen |
| 2,910,573 | A | | 10/1959 | Bing et al. |
| 3,258,586 | A | | 6/1966 | Blizzard |
| 4,017,727 | A | * | 4/1977 | Yamamoto ............ 362/16 |
| 4,052,607 | A | * | 10/1977 | Larson ................. 362/18 |
| 4,078,170 | A | | 3/1978 | Sloop |
| 4,099,221 | A | | 7/1978 | Carrillo |
| 4,122,333 | A | * | 10/1978 | Crouse ................. 362/18 |
| 4,194,234 | A | | 3/1980 | Geissler |
| 4,233,648 | A | | 11/1980 | Geissler |
| 4,242,616 | A | | 12/1980 | Takematsu |
| 4,272,169 | A | | 6/1981 | Stone |
| 4,337,506 | A | | 6/1982 | Terada |

(Continued)

OTHER PUBLICATIONS

Spectra Light Diffuser, retrieved from the Internet on Apr. 10, 2009, URL: www.SpectraLightDiffuser.com.

(Continued)

*Primary Examiner*—Sandra L O'Shea
*Assistant Examiner*—Leah S Lovell
(74) *Attorney, Agent, or Firm*—David Pressman

(57) ABSTRACT

A diffuser-reflector assembly for use with a photographic flash lamp (800) comprises, in one aspect, an elastic base (100) having rigid first inserts (125 and 130), two arms (105 and 110), a shaft (135), a pivot assembly (150), and one or more frames (116, 121) that hold second inserts (115, 120). The diffuser-reflector assembly installs slidably onto the light-emitting end of a flash lamp (800). The second inserts can have various optical properties. They can be specular or diffuse reflectors, color or neutral density filters, or a combination. The frames and inserts can be swung on the arms and independently pivoted over a wide range of angles above the lamp, thereby providing a wide range of lighting effects. The frames and arms are held in place by friction and can be adjusted by manual force. The entire assembly can be made of simple parts that snap together.

20 Claims, 2 Drawing Sheets

U.S. PATENT DOCUMENTS

| | | | |
|---|---|---|---|
| 4,380,787 | A | 4/1983 | Stone |
| 4,460,946 | A | 7/1984 | Tinz |
| 4,539,624 | A | 9/1985 | Stone |
| 4,777,566 | A | 10/1988 | Lowell et al. |
| 4,994,946 | A | 2/1991 | NakaMats |
| 5,136,312 | A | 8/1992 | Weaver et al. |
| 5,194,885 | A | 3/1993 | Spencer |
| 5,311,409 | A * | 5/1994 | King .......................... 362/17 |
| 5,337,104 | A | 8/1994 | Smith et al. |
| 5,347,432 | A * | 9/1994 | Chiavetta .................... 362/18 |
| 5,778,264 | A | 7/1998 | Kean |
| 6,234,638 | B1 | 5/2001 | Beverly |
| 6,614,999 | B2 | 9/2003 | Hagiuda |
| 2006/0109640 | A1 | 5/2006 | Fong |
| 2008/0181598 | A1 | 7/2008 | Kobre |
| 2008/0204883 | A1* | 8/2008 | Fong .......................... 359/599 |
| 2009/0129046 | A1* | 5/2009 | Fong .......................... 362/18 |

OTHER PUBLICATIONS

Actual products in marketplace. http://www.harbordigitaldesign.com Ultimate Light Box, Dome Bounce Diffuser.

Actual products in marketplace. http://www.garyfong.com Lightsphere (II/Universal, Clear/Cloud), WhaleTail (Reporter/Studio), ORIGAMI.

Actual products in marketplace. http://www.dembflashproducts.com Flip-it!, Double Flip-it!, Demb Flash Diffuser Pro.

Actual products in marketplace. http://www.stofen.com Omni Bounce, Two-Way UNI.

Actual products in marketplace. http://www.abetterbouncecard.com Baby/Regular/PRO ABBC bounce card, ABBC Feather-Light bounce cards.

Actual products in marketplace. http://www.lumiquest.com 80-20, Big Bounce, MidiBouncer, Mini SoftBox, Pocket Bouncer, Softbox, SoftBox II, UltraBounce.

Actual product in marketplace. http://users.aol.com/shellfoto/flash.html The Shell.

Actual product in marketplace. http://www.fjwestcott.com Micro Apollo.

Actual products in marketplace. http://www.milagrid.com MilaGrid, BounceGrid, PowerGrid, TeleGrid.

Actual product in marketplace. http://www.takegreatphotos.com Hughes Softlight Reflector.

Actual products in marketplace. http://www.paramountcords.com Illuminator, Lightfuze Digidome.

Actual product in marketplace. http://www.spectradiffuser.com Spectra Light Diffuser.

* cited by examiner

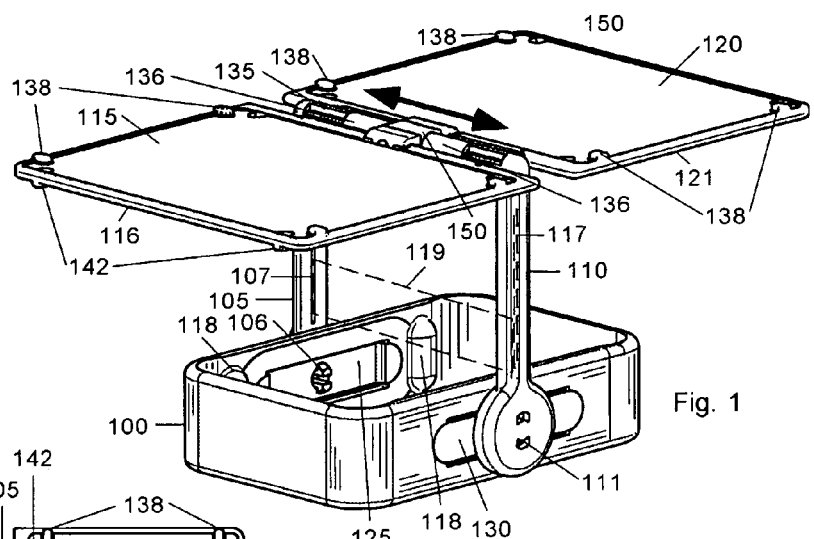
Fig. 1
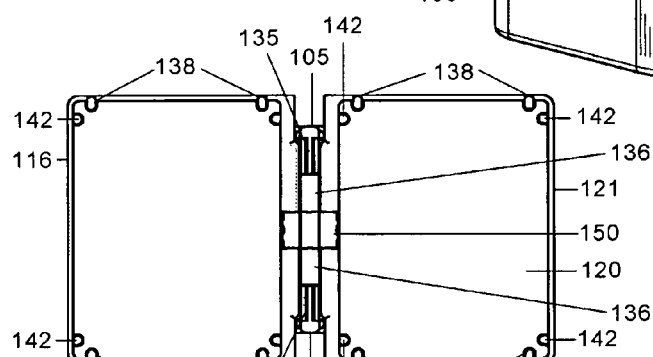
Fig. 2
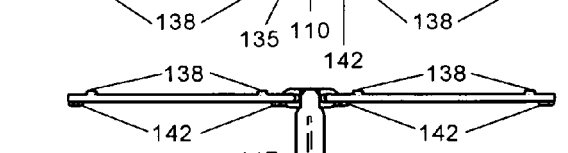
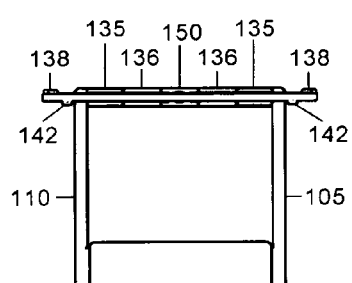
Fig. 3
Fig. 4
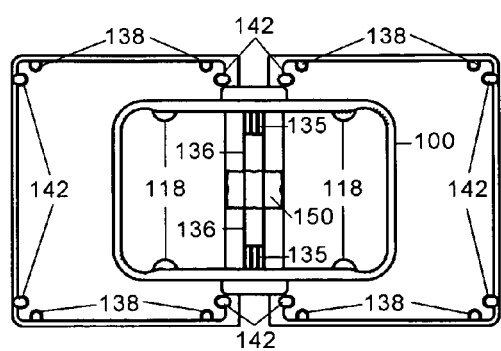
Fig. 5

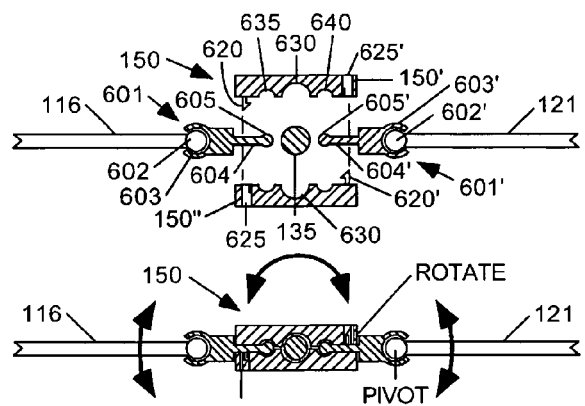
Fig. 6
Fig. 7
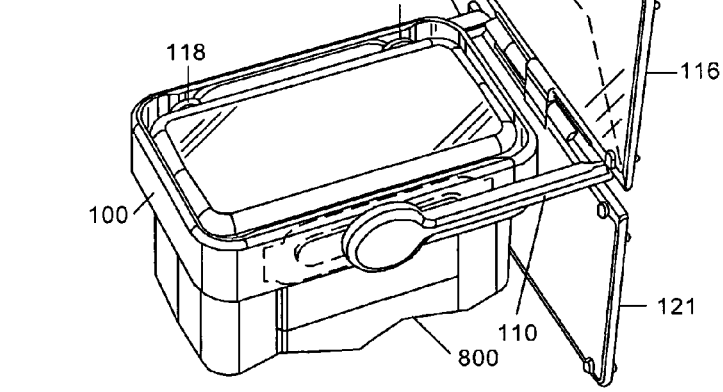
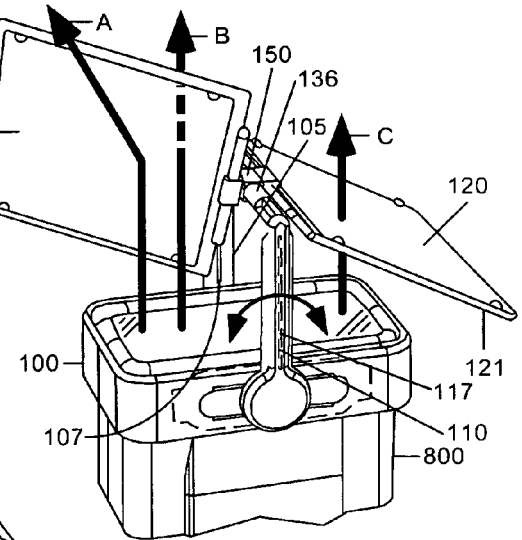
Fig. 8
Fig. 9

COMPACT, STEERABLE, MULTIDIRECTIONAL PHOTOGRAPHIC LIGHT DIFFUSER AND REFLECTOR

CROSS-REFERENCE TO RELATED APPLICATION

This application claims priority of my provisional patent application Ser. No. 60/936,852, filed Jun. 21, 2007.

BACKGROUND

1. Field

The field is photographic illumination, and in particular reflectors and diffusers for light emanated by photographic flash lamps.

2. Prior-Art Diffusers and Reflectors

The following is a list of some prior art that presently appears relevant:

| Patent or Pub. Nr. | Kind Code | Issue or Pub. Date | Patentee or Applicant |
|---|---|---|---|
| 2910573 | B1 | 1959-10-27 | Bing et al. |
| 3258586 | B1 | 1966-06-28 | Blizzard |
| 4078170 | B1 | 1978-03-07 | Sloop |
| 4099221 | B1 | 1978-07-04 | Carrillo |
| 4122333 | B1 | 1978-10-24 | Crouse |
| 4194234 | B1 | 1980-03-18 | Geissler |
| 4233648 | B1 | 1980-11-11 | Geissler |
| 4242616 | B1 | 1980-12-30 | Takematsu |
| 4272169 | B1 | 1981-06-09 | Stone |
| 4380787 | B1 | 1983-04-19 | Stone |
| 4539624 | B1 | 1985-09-03 | Stone |
| 4777566 | B1 | 1988-10-11 | Lowell et al. |
| 5136312 | B1 | 1992-08-04 | Weaver et al. |
| 5194885 | B1 | 1993-03-16 | Spencer |
| 5337104 | B1 | 1994-08-09 | Smith et al. |
| 5778264 | B1 | 1998-07-07 | Kean |
| 6234638 | B1 | 2001-05-22 | Beverly |
| 6614999 | B2 | 2003-09-02 | Hagiuda |

Flash lamp diffusers and reflectors are used in photography to produce various lighting effects. A simple, forward-facing flash lamp and reflector are used in low-cost cameras to illuminate the subject being photographed. While such an arrangement provides an adequate light level for a photograph, the resultant image is often over-illuminated at the center, under-illuminated at the edges, and contains shadows.

Improved results are obtained when light from a flash lamp is reflected from a surface, such as a ceiling, before reaching the subject. This type of illumination is called a "bounce flash". The reflected light effectively emanates from a larger source than the flash lamp itself, resulting in more uniform illumination of the subject. A diffuser can be added to the flash lamp assembly to further smooth variations in light as it strikes the subject.

Bing et al. show a bracket that is interposed between a camera and a flash lamp assembly. Without the bracket, the flash assembly mounts on the camera so that the light from the flash is projected along a line parallel to the lens axis. With the bracket, the flash assembly is repositioned so that its light is projected perpendicular to the lens axis and typically aimed at a ceiling. While this apparatus eliminates direct illumination of a subject, light emanates from this apparatus in only a single direction, thereby providing limited bounce capabilities.

Carrillo shows a reflector assembly and flash lamp mounting bracket combined. The bracket orients the flash lamp so that the light from the lamp is projected upward. A reflector is mounted at an angle on an adjustable arm and positioned directly above the flash lamp. The reflector is oriented so that light from the flash lamp strikes the reflector and is deflected in the direction of the subject being photographed. This provides a portable "ceiling" for a bounce flash. Sloop shows a similar device with two mounting brackets. A first bracket extends upward from a camera and holds a flash lamp. A second bracket extends from the first and holds a reflector at an angle above the flash lamp. This assembly is cumbersome, in that it requires a bracket to hold a camera, the flash lamp, and the reflector together as a unit.

Blizzard, Lowell et al., and Beverly show bounce light deflectors and diffusers that are similar to the previous devices, except they attach directly to the flash lamp assembly. Lowell's device primarily shapes the beam of light leaving the flash.

Kean shows a reflector that mounts onto a camera and through multiple reflections enlarges the area of the camera's own forward-facing flash. Light leaving the reflector is directed along the lens axis of the camera. This reflector only enlarges the apparent area of the flash lamp. The bounce effect is limited since light is not bounced from a distant surface.

Smith et al. show a reflector assembly similar to a periscope that is mounted on a camera. Light from the camera's own flash unit emerges parallel to, but is displaced from the camera's flash lamp. This device is helpful in reducing "red-eye", the retinal reflection that commonly occurs when light from the camera's flash is reflected from a subject's eyes back into the camera's lens. This assembly does not effectively enlarge the source of light by bouncing the light off a distant surface, such as a ceiling.

Other prior-art devices, such as the model Mecablitz 58AF-1, manufactured by Metz-Werke GmbH & Co. KG, Zirndorf, Germany, incorporate a flash lamp into a tilting reflector. The assembly comprising the lamp, reflector, and associated electronics mount in the "hot shoe" on a camera, in well-known fashion. The lamp assembly can also swivel on the shoe, providing a light source that can be beamed in many directions, thereby producing a bounce flash. This flash assembly can be arranged to act independently or in concert with the flash unit contained in a camera. Light emanates from this apparatus in only a single direction, thereby providing limited bounce capabilities.

Takematsu shows a swivel lamp similar to the above with the addition of a second flash lamp. A first lamp provides a movable bounce flash, while the second lamp directs its light toward the subject. While this apparatus provides bounced light, it requires two flash lamps and does little to prevent red-eye.

Hagiuda et al. show a flash assembly that combines a bounce flash, similar to the Mecablitz above, with a dimming structure for a forward-facing camera flash lamp. An external bounce flash mounts on a camera. The external flash includes a fold-down dimming plate that partially blocks the direct light from the camera's flash. Again, as in Takematsu, both direct and indirect light illuminate the subject for an improved result. As with the Mecablitz, however, the bounce light travels from the flash lamp to the bounce surface at only a single, predetermined angle.

Crouse shows a reflective device for use with a source of flash illumination for providing either indirect or simultaneous direct and indirect illumination of a subject. The amount of reflected illumination is variable through the use of means such as movable shutters or polarizer sheets mounted on the reflective member. The amount of direct illumination is determined by the size of a pass-through in the reflector. Bounce light provided by this device emanates at a predetermined angle with respect to the camera, thus only a single source of bounce light is produced.

Weaver et al. show a flash apparatus having two flash lamps. A first lamp and reflector are directed toward the subject. A second lamp and reflector rotate about an axis perpendicular to the line between the camera lens and the subject. A third, infrared, illumination source emanates vertically from the flash apparatus and bounces off a ceiling or panel above the camera that is parallel to the line between the camera lens and the subject. The infrared light reflected from the ceiling is received by the flash apparatus which determines the distance between the flash and the ceiling. This distance is used to calculate the proper angle of rotation of the second lamp in order to maximize illumination of the subject by that lamp. While this apparatus maximizes the light from the bounce lamp, it does not provide bounce light from a plurality of surfaces.

Spencer shows a similar illuminator apparatus that uses range finders on a camera to determine the vertical distance, D, from the camera to the ceiling and the horizontal distance, H, from the camera to the subject. These values are used by a logic circuit that drives a servomechanism to angularly position the illuminator on the camera for optimum illumination of the subject. As with Weaver, this illuminator provides optimal bounce light intensity from a single bounce surface, but not from a plurality of surfaces Geissler shows several bounce flash assemblies, each comprising a single tubular flash lamp situated within a partitioned reflector. The reflectors are arranged to rotate about the axis of the flash lamp. Part of the reflector directs a portion of the light from the flash lamp in a first direction, while the rest of the reflector directs the remaining light in a second direction, thereby providing adjustable illumination of the subject. This bounce flash has similarities to the Mecablitz unit described above. Light is reflected from a horizontal bounce surface above, and possibly below, the camera. However, bounce light cannot be obtained from vertical surfaces such as walls located to the sides of the flash lamp.

Stone shows several devices that clamp onto flash guns. In a first device, a bracket that is attached to a flash lamp unit forms a slot for mounting reflectors and diffusers. In a second device, a clamp that slips over a flash lamp assembly includes slots into which reflectors and diffusers can be inserted. In a third device, a diffusion device that slips over a flash lamp assembly includes a slot that can retain a reflector. Stone's reflectors and diffusers are inserted into their slots at fixed angles and thus can not be rotated or pivoted to direct light in any desired direction.

All of the above prior-art deflectors and diffusers thus have one or more of the following disadvantages. While they all work as described, none combine a plurality of independently positionable, dual-purpose panels that independently tilt, pivot, move longitudinally and laterally with respect to the center of a flash lamp assembly in a simple structure.

SUMMARY

In accordance with one embodiment of one aspect, a light diffuser and reflector assembly is provided with a pair of movable arms that suspends two double-sided specular and diffuse reflectors above a flash lamp assembly. In another aspect, the assembly easily mounts onto a range of sizes of flash lamps. In yet another aspect, the reflectors and diffusers pivot and tilt, permitting the user to direct light in a wide range of predetermined directions relative to the flash lamp. In still another aspect, the arms holding the diffusers and reflectors pivot and move slidably on the mount that attaches the entire assembly to the flash lamp.

DRAWING FIGURES

FIG. 1 is a perspective view of a first embodiment.

FIGS. 2 through 5 are respectively top, side, bottom, and end views of the embodiment of FIG. 1.

FIG. 6 is a cross-sectional, exploded view showing rotating and pivoting components of the embodiment of FIG. 1.

FIG. 7 is a cross-sectional view of the pivot of FIG. 6 after assembly.

FIG. 8 is a perspective view of the embodiment of FIG. 1, mounted on a flash lamp.

FIG. 9 shows the embodiment of FIG. 1 in use.

DRAWING FIGURE REFERENCE NUMERALS

100 Base
105 Arm
106 Finger
107 Groove
110 Arm
111 Finger
115 Reflector
116 Frame
117 Groove
118 Bumper
119 Baffle
120 Reflector
121 Frame
125 Insert
130 Insert.
135 Shaft
136 Bushing
138 Finger
142 Finger
150 Pivot
601 Pivot
602 Male portion
603 Female portion
604 Projection
605 End
620 Hook
625 Eye
800 Lamp

FIRST EMBODIMENT

Description—FIGS. 1 through 7

FIG. 1 shows an assembled, perspective view of one aspect of a first embodiment of a light diffuser and reflector. This aspect comprises a partially elastic and flexible base 100, two rigid, parallel arms 105 and 110, and two diffuser-reflectors (reflectors) 115 and 120 that are held in a pair of frames 116 and 121, respectively.

Base 100 includes a pair of rigid inserts 125 and 130. Inserts 125 and 130 are preferably made of a rigid plastic material such as polyamide or polycarbonate, although they can be made of metal, wood, or a composite. The centered holes are typically between 3 and 5 mm in diameter, but can be larger or smaller. Arms 105 and 110 include springable fingers 106 and 111 at their lower ends. Fingers 106 and 111 snap into centered holes in inserts 125 and 130, respectively, and are rotatable within but secure in such holes. The upper ends of arms 105 and 110 are rigidly joined by a pivot shaft 135. Base 100 further includes a plurality of bumpers 118 that hold fingers 106 and insert 125 a short distance away from flash lamp body 800 (FIGS. 8 and 9), in order to avoid protrusions (not shown) frequently found on flash lamp housings, and to prevent surface damage, such as scratches, to lamp 800.

Arms 105 and 110 optionally include grooves or slots 107 and 117. A baffle 119 (FIG. 1) can be inserted in grooves 107 and 117 to provide additional lighting effects, if desired. Baffle 119 can be any color or gray, and is typically made of paper, although other materials such as wood or plastic can be used.

Reflectors 115 and 120 are securely held between upper fingers 138 and lower fingers 142 that extend inward from frames 116 and 121. A pivot assembly 150 rotatably and pivotably attaches frames 116 and 121 to shaft 135. Pivot assembly 150 is shown in more detail in FIG. 6.

Reflectors 115 and 120 are typically 3 and 6 cm in width and length, respectively, and 1 mm thick, although other sizes can be used. They can be made of a variety of materials including clear or metalized plastic, metal, glass, and even wood or hard rubber. Their surfaces can range from highly reflective, to non-reflective, and can be of any color. They can be translucent or transparent, incorporating colors or neutral gray, and can optionally incorporate two-dimensional (2-D) and three-dimensional (3-D) patterns of various types having opaque and translucent regions. In addition, reflectors 115 and 120 can be textured, like sandpaper, or smooth, flat or not-flat, like a concave or convex mirror.

Arms 105 and 110, frames 116 and 121, inserts 115 and 120, shaft 135, and pivot assembly 150 are all preferably made of a sturdy, rigid plastic material such as polyamide or polycarbonate. Such plastic components can be injection molded. Alternatively, they can be made of metal or wood. All parts, except inserts 115, 120, and baffle 119, can be any color; however I presently prefer a non-reflective black color.

Base 100 is preferably made of a semi-rigid, stretchable material such as caoutchouc, or a synthetic rubber or plastic material. The inner dimensions of base 100, approximately 3×7 cm in width and length respectively, are sized to accommodate a standard photographic flash lamp attachment; the height is approximately 2.5 cm. Other sizes can be used. The wall thickness of base 100 varies between about 3 and 5 mm.

FIG. 6 shows an exploded view of pivot assembly 150. Assembly 150 includes upper and lower, mirror-image portions 150' and 150", respectively. A first pivot 601 comprises a male portion 602 attached to the inner edge of frame 116, and a female portion 603. Female portion 603 includes a projection 604 that terminates in a bulbous end 605. Similar pivot components 602', 603', 604', and 605' comprise a pivot 601' that is attached to the edge of frame 121.

Portions 150' and 150" of assembly 150 include hook-and-eye portions 620 and 625, respectively. They also include a cylindrical opening 630, sized to slidably fit over shaft 135, and two spherical (or alternative shaped) pockets 635 and 640 that are sized to capture bulbs 605 and 605', while allowing pivots 601 and 601' to rotate.

Bushings 136 on shaft 135 (FIG. 1) are attached to and extend from assembly 150. Bushings 136, assembly 150, and frames 116 and 121 with inserts 115 and 120 (if present) are able to move slidably on shaft 135, as indicated by the solid arrows in FIG. 1.

FIG. 7 shows pivot 150 after assembly. Portions 150' and 150" are snapped together by engaging hooks 620 and 620', and eyes 625 and 625'. Alternatively, portions 150' and 150" can be glued or fused together.

Assembly 150 is able to rotate on shaft 135, i.e. with some friction, but movable with manual force. Similarly, frames 116 and 121 can be rotatably repositioned within assembly 150 as portions 604, 604', 605, and 605' rotate within assembly 150, but are restrained with sufficient friction to remain stationary after manual force is released. Portions 605 and 605' retain pivots 601 and 601' within assembly 150.

Frames 116 and 121 pivot within pivots 601 and 601', and are restrained with sufficient frictional force to be manually moveable, but will remain stationary after any manual force is removed.

FIRST EMBODIMENT

Operation—FIGS. 8 and 9

FIGS. 8 and 9 show the reflector assembly securely mounted over the light-emanating end of a standard flash lamp 800. For ease of installation, arms 105 and 110 are rotated to the horizontal position shown, moving frame assemblies 116 and 121 out of the way and enabling the user (not shown) to apply downward force on base 100. Base 100 is stretchably slid over the end of lamp 800 until the top surface of base 100 is level with the top surface of lamp 800.

Lamp 800 can be used with no reflection from the surface of insert 115. Alternatively, frame 116 and surface 115 can be tilted downward over lamp 800, as shown by dashed lines, to reflect a portion of the light emanating from lamp 800.

FIG. 9 shows the reflector assembly with arms 105 and 110 in a vertical position over lamp 800. Frames 116 and 121 can be rotated about the axes of projections 604 and 604', thereby directing light from lamp 800 in any desired direction. Arrow A (FIG. 9) shows light being specularly or diffusely reflected from the surface of insert 115. Arrow B shows light being partially transmitted through insert 115. Arrows A and B together show light being simultaneously reflected and transmitted by insert 115. Arrow C shows light being transmitted through insert 120.

Baffle 119 (FIG. 1) can be added when arms 105 and 110 are oriented vertically, in order to provide additional options for directing light from lamp 800.

FIGS. 8 and 9 show arms 105 and 110 positioned at 0 degrees and 90 degrees, respectively. They can be positioned at any angle between 0 and 180 degrees in this embodiment. By proper positioning and choice of inserts 115 and 120, the user can obtain a large range of lighting effects.

CONCLUSION, RAMIFICATIONS, AND SCOPE

The embodiments shown of my diffuser-reflector assembly provide several useful and advantageous features. Light can be projected to one or more bounce surfaces at virtually any predetermined direction relative to the flash lamp. This permits the user to determine the nature of the light cast from colored or neutral walls and ceilings, as well as shadows on and around a subject being photographed. The assembly can be made inexpensively. The pieces can be made to snap together for manual or automatic assembly. The assembly requires no training for use. It is rugged, unobtrusive, and provides lighting effects not previously available to the user, such as multi-directional, specular bounce lighting, the ability to position diffusers and reflectors at any location above the flash lamp, and the ability to reach angles beyond the capability of prior-art devices.

While the above description contains many specificities, these should not be considered limiting but merely exemplary. Many variations and ramifications are possible. For example, arms 105 and 110 can be made to change their length in a telescoping manner, providing an additional adjustment for the user. Instead of being secured to the flash lamp by friction and compression, the diffuser-reflector assembly can be secured by tape, screws, wedges, glue, or other means. Instead of being of the same size, the frames and diffusers or reflectors can be of two different sizes. Instead of both being able to pivot, one can be fixed in position while the other pivots. Instead of stretching to fit over existing lamp sizes, the base of the diffuser-reflector assembly can include telescoping sides, ends, or both in order to accommodate a variety of sizes of flash lamps not reachable by an elastic base. The inserts can be permanently installed in the frames, rather than being removable and replaceable. Arms 105 and 110 can further include detents that interact with base 100. The detents can secure the arms to the base at predetermined angles so that extra manual force is required to move the arms.

While the present system employs elements which are well known to those skilled in the art of diffuser-reflector design, it combines these elements in a novel way which produces new results not heretofore discovered. Accordingly the scope should be determined, not by the embodiments illustrated, but by the appended claims and their legal equivalents.

The invention claimed is:

1. A reflector-diffuser assembly for light, comprising:
   an elastic base having a pair of first rigid inserts,
   a pair of arms, each of which has first and second ends,
   said first end of each of said pair of arms rotatably secured to a respective one of said pair of first rigid inserts,
   a shaft, said shaft extending rigidly between said second end of said pair of arms,
   a pivot assembly rotatably mounted on said shaft,
   at least one frame, said frame having a second insert,
   said frame pivotally and rotatably attached to said pivot assembly on said shaft,
   said arms being rotatable in said first inserts, said frame being pivotable and rotatable in said pivot assembly, and said pivot assembly being rotatable on said shaft,
   whereby said second insert can be oriented at a range of angles with respect to said base.

2. The reflector-diffuser assembly of claim 1 wherein said pivot assembly is arranged to slidably move along said shaft when urged by manual force.

3. The reflector-diffuser assembly of claim 1, further including two of said frames, each of which is pivotally and rotatably attached to said pivot assembly on said shaft, and two of said second inserts, one of said second inserts being installed in each of said frames.

4. The reflector-diffuser assembly of claim 1 wherein each of said arms further includes a groove for holding a baffle, so that said baffle can optionally be installed in said grooves.

5. The reflector-diffuser assembly of claim 1 wherein said second inserts have optical properties selected from the group consisting of specular reflection, diffuse reflection, translucence, transparency, color, neutral density, textured, smooth, concave, and convex.

6. The reflector-diffuser assembly of claim 5 wherein said second inserts include a plurality of said optical properties arranged in patterns selected from the group consisting of two-dimensional and three-dimensional patterns.

7. The reflector-diffuser assembly of claim 1 wherein said base is made from material selected from the group consisting of caoutchouc, synthetic rubber, and plastic.

8. The reflector-diffuser assembly of claim 1 wherein said base is sized to slidably mount on a predetermined flash lamp and be secured in place by frictional forces between said base and said lamp.

9. The reflector-diffuser assembly of claim 1 wherein said arms, said frames, said first and second inserts, said shaft, and said pivot assembly are made from material selected from the group consisting of rigid plastic, metal, and wood.

10. A method for controlling light from a flash lamp, comprising:
    providing a flash lamp capable of emitting light,
    providing an elastic base having a pair of first rigid inserts,
    providing a pair of arms, each having first and second ends,
       said first ends of said arms being pivotally attached to said pair of first rigid inserts, respectively,
    providing a shaft joining said second ends of said arms,
    providing a pivot assembly rotatably mounted on said shaft,
    providing at least one frame having a second insert, said frame pivotally and rotatably attached to said pivot assembly,
    inserting said second insert into said frame,
    slidably attaching said base to said flash lamp,
    manually positioning said frame and said second insert above said lamp to direct said light in a desired direction,
    whereby when said lamp emits said light, said light is directed in said desired direction.

11. The method of claim 10 wherein said pivot assembly is arranged to slidably moves along said shaft when urged by manual force.

12. The method of claim 10, further including two of said frames, each of which is pivotally and rotatably attached to said pivot assembly on said shaft, and two of said second inserts, one of said inserts being installed in each of said frames.

13. The method of claim 10 wherein each of said arms further includes a groove for holding a baffle, so that said baffle can optionally be installed in said grooves.

14. The method of claim 10 wherein said second inserts have optical properties selected from the group consisting of specular reflection, diffuse reflection, translucence, transparency, color, color, neutral density, textured, smooth, concave, and convex.

15. The method of claim 14 wherein said second inserts include a plurality of said optical properties arranged in patterns selected from the group consisting of two-dimensional and three-dimensional patterns.

16. The method of claim 10 wherein said base is made from material selected from the group consisting of caoutchouc, synthetic rubber, and plastic.

17. The method of claim 10 wherein said arms, said frames, said first and second inserts, said shaft, and said pivot assembly are made from material selected from the group consisting of rigid plastic, metal, and wood.

18. A light reflecting and diffusing assembly, comprising:
    an elastic base having a pair of first rigid inserts,
    a pair of arms, each of which has first and second ends,
    said first end of each of said pair of arms rotatably secured to a respective one of said pair of first rigid inserts,
    a shaft, said shaft extending rigidly between said second end of said pair of arms,
    a pivot means rotatably mounted on said shaft,
    at least one frame, said frame having a second insert,
    said frame pivotally and rotatably attached to said pivot means on said shaft,
    said arms being rotatable in said first inserts, said frame being pivotable and rotatable in said pivot means, and said pivot means being rotatable on said shaft,
    whereby said second insert can be oriented at a range of angles with respect to said base.

19. The assembly of claim 18 wherein said pivot means is arranged to slidably move along said shaft when urged by manual force.

20. The assembly of claim 18, further including two of said frames, each of which is pivotally and rotatably attached to said pivot means on said shaft, and two of said second inserts, one of said second inserts being installed in each of said frames.

* * * * *